United States Patent
Barndt et al.

(12)
(10) Patent No.: US 6,871,810 B2
(45) Date of Patent: Mar. 29, 2005

(54) PACKING OF A MAGNETIC TAPE TO IMPROVE PACK STABILITY PRIOR TO REMOVAL FROM A TAPE DRIVE

(75) Inventors: Richard D. Barndt, Fremont, CA (US); Erik Vaaler, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 707 days.

(21) Appl. No.: 09/353,173

(22) Filed: Jul. 14, 1999

(65) Prior Publication Data

US 2001/0045479 A1 Nov. 29, 2001

(51) Int. Cl.[7] .............................................. B65H 59/38
(52) U.S. Cl. .............................. 242/334.1; 242/334.2; 360/69
(58) Field of Search ............................ 242/334.2, 324, 242/334, 334.1; 360/69, 74.3

(56) References Cited

U.S. PATENT DOCUMENTS

| | | | |
|---|---|---|---|
| 5,865,389 A | * | 2/1999 | Gonzales .................... 242/358 |
| 5,886,845 A | | 3/1999 | Kilaparti et al. .............. 360/69 |

* cited by examiner

*Primary Examiner*—John Q. Nguyen

(57) ABSTRACT

A magnetic tape is packed prior to removal from a tape drive. The tape is packed by completely unwinding the tape and then completely rewinding the tape without reading or writing to the tape. Completely unwinding the tape and then completely rewinding the tape reduces air entrainment and thereby reduces the susceptibility of the tape to damage after removal from the tape drive.

5 Claims, 1 Drawing Sheet

PACKING OF A MAGNETIC TAPE TO IMPROVE PACK STABILITY PRIOR TO REMOVAL FROM A TAPE DRIVE

BACKGROUND OF THE INVENTION

The invention relates to computer data storage devices. More specifically, the invention relates to a magnetic tape drive and a method of using the tape drive to pack a magnetic tape (that is, wind the magnetic tape onto a reel).

Major causes of data loss in computers include accidental file deletion, hard-drive malfunctions, viruses and system failures, power surges, theft of computers and natural disasters such as fires. Installing and uninstalling software can also cause data loss.

Loss of data stored in a computer can result in a significant loss of time and money. For a business, any of these causes can result in the loss of client lists, product information, payroll, personnel files, tax records and other vital information. The consequences can be disastrous.

Tape technology offers efficient and cost-effective protection against data loss. Tape drives offer a range of media that allow data on hard drives and servers to be backed up. A snapshot of a full system, including programs and data files, can be captured on a single tape cartridge. Backing up a computer on a regular basis will ensure that vital data is not lost.

The tape cartridges typically include one or two reels. A Travan cartridge is a well known type of two-reel cartridge. Magnetic tape is wound between a supply reel and a take-up reel. A "3480/3490" cartridge is a well known type of single reel cartridge. Magnetic tape is wound onto a single reel.

During certain operations, such as seeks, fast forwards and rewinds, the tape is wound or rewound onto the reels at high speeds. As the tape is being wound onto the reels, air becomes entrained between the tape. The entrained air then leaks out over a period of time (about one second), resulting in a "soft" pack. The soft pack increases the susceptibility of the tape to damage in the event the tape cartridge is dropped or jarred. The damage occurs when portions of the tape become displaced from the centerline of the pack and consequently come into contact with flanges, guides, etc.

The tape must be protected against damage and degradation. If the tape becomes damaged or degraded, valuable data might be lost forever.

Therefore, a need exists to reduce the likelihood of tape damage and degradation that results from air entrainment.

SUMMARY OF THE INVENTION

This need is met by the present invention. According to one aspect of the present invention, a tape drive is used to pack a magnetic tape. The tape is packed by using the tape drive to completely unwind the tape and then completely rewind the tape without reading or writing to the tape. After the tape has been rewound, the tape is removed from the tape drive.

The tape may be rewound at a speed that is substantially slower than maximum speed of the tape drive, or it may be rewound at a higher speed and higher tension. Completely unwinding the tape and then completely rewinding the tape reduces the effects of air entrapment.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
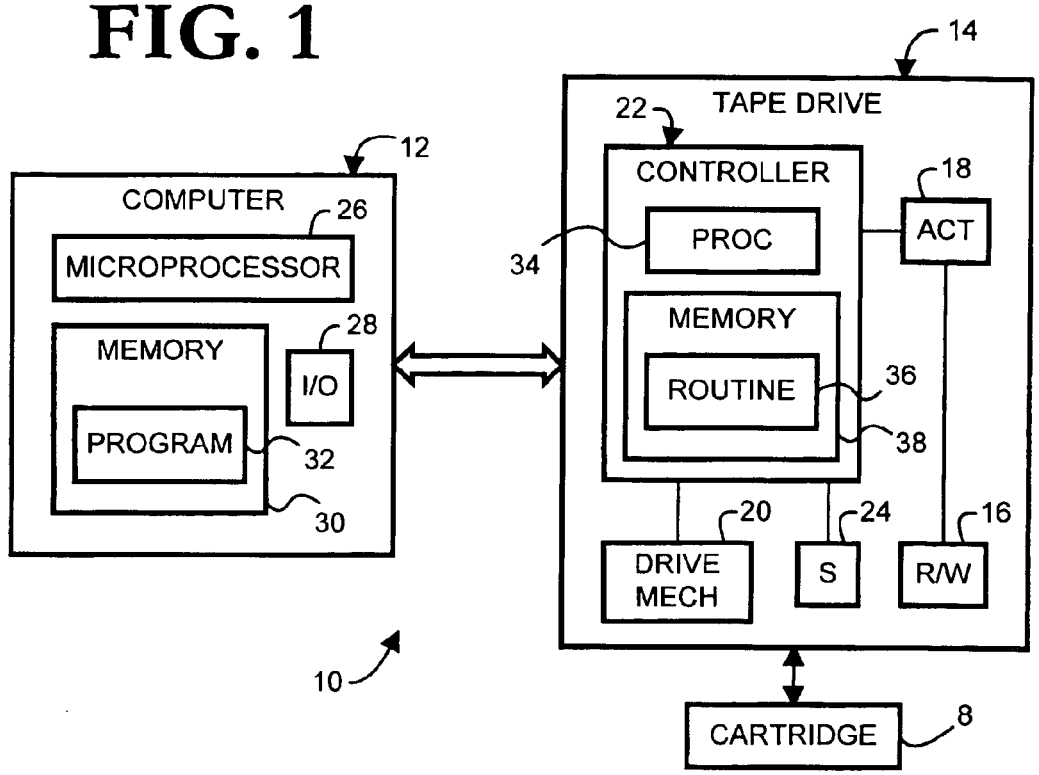
FIG. 1 is an illustration of a computer system including a tape drive and a computer for commanding the tape drive to pack a magnetic tape prior to removal from the tape drive.

As shown in the drawings for purposes of illustration, the present invention is embodied in a computer system including a computer and a tape drive. The tape drive has a mode of operation in which a magnetic tape is completely unwound and then completely rewound to avoid air entrainment. Resulting is a solid, tight pack, which reduces the susceptibility of the tape to damage and degradation after being removed from the tape drive.

FIG. 1 shows a magnetic tape cartridge 8 of standard construction. The tape cartridge 8 could include one or two reels. A two-reel tape cartridge includes a supply reel, a take-up reel and a tape wound between the two reels. A single reel-cartridge includes only the supply reel and a magnetic tape wound around the supply reel.

FIG. 1 also shows a computer system 10 including a computer 12 and a tape drive 14. The tape drive 14 includes a magnetic read/write head 16, an actuator 18 for positioning the read/write head 16, a drive mechanism 20 for controlling tape movement, and a tape controller 22 for controlling the actuator 18, the drive mechanism 20, and the writing and reading of data to and from the read/write head 16. The read/write head 16, actuator 18 and drive mechanism 20 may all be of standard construction. A wide range of drive mechanisms 20 is available for controlling the tape movement. For example, the drive mechanism 20 may include a single motor and a belt drive for controlling tape speed, direction and tension; or it may include first and second motors coupled to the reels for controlling tape speed, direction and tension; or it may include two motors for controlling tape tension and a third motor for controlling tape speed and direction. In a tape drive for single-reel tape cartridges, the drive mechanism would also include a reel. A tape drive 14 for a single reel cartridge would also include an automated tape threading subsystem.

The tape drive 14 also includes a mechanism for sensing when the tape drive reaches the beginning and end of the tape. The sensing mechanism could include an optical marker sensor 24 for sensing beginning-of-tape and end-of-tape markers on the tape. An output signal indicating end-of-tape and beginning-of-tape is supplied by the optical marker sensor 24 to the tape controller 22.

The tape controller 22 contains all of the low level commands for operating the tape drive 14. The low level commands include commands for controlling the motor or motors of the drive mechanism 20. Motor control commands might include speed and direction commands. In a two-motor drive mechanism, for example, a speed/direction command could be issued for each motor.

The tape controller 22 receives high level commands from the computer 10. Standard high level commands include a "store data" command, a "retrieve data" command, a "fast forward" command and a "rewind/eject" command. In response to the "fast forward" and "rewind/eject" commands, the tape controller 22 typically controls the drive mechanism 20 to move the tape at the highest available speed toward a physical beginning-of-tape and end-of-tape. In response to the "store data" and "retrieve data" commands, the tape controller 22 controls the drive mechanism 20 to move the tape, usually at a slower read/write speed, in the direction of reading and writing.

The high level commands also include a "Tape Pack" command. In response to the Tape Pack command, the tape controller 22 controls the drive mechanism 20 to completely unwind the tape (for example, unwind the tape to the end-of-tape marker). After the tape has been completely unwound, the tape controller 22 controls the drive mechanism 20 to completely rewind the tape (for example, rewind the tape to the beginning-of-tape marker) without reading or writing to the tape.

The tape may be unwound at maximum speed and rewound at a substantially slower available speed. The "maximum" speed and "substantially slower" speed are relative. Actual speeds will vary from tape drive to tape drive. Typically, the tape drive 14 will perform fast forwarding and rewinding at a maximum speed, and it will perform reads and writes at a speed that is usually substantially slower than the maximum speed. Tape tension will typically be nominal during the read/write operations and the fast forward/reverse operations.

Completely unwinding the tape and then completely rewinding the tape at the slow speed causes the tape to be packed tightly and solidly. The solid, tight pack reduces the susceptibility of the tape to damage and degradation after being removed from the tape drive.

For example, the tape is unwound at a maximum speed of five meters/second and then rewound at a speed in the range of 0.5 meters per second. During rewinding, tape tension is nominal, in the range of 1 newton. A tape cartridge having 500 meters of tape would take about 1000 seconds to rewind. This might pose an unacceptable waiting period for a user.

Therefore, the tape may be rewound at a higher (sub-maximum) speed, but also at a higher tension. For example, rewinding the tape at a speed of 4 meters per second and a tension of about 1.5 netwons would reduce waiting time eightfold.

The actual speed and tension will depend upon several factors. Air entrainment is an effect that gets progressively worse as tape speed goes up and/or tape tension goes down. Packing tension may be varied as a function of speed, pack diameter, media composition, expected shipping and storage conditions, shock, temperature and time. Tape width and coating formulation (roughness) may also have an influence on the threshold at which air entrainment becomes a problem. Some surfaces might be so rough that winding the tape too tightly would damage the surface. Other surfaces might stick together if packed too tightly. Still other surfaces might be so smooth that the pack cannot be controlled if the tape tension is too low.

As mentioned above, the computer 12 sends the Tape Pack command to the tape drive 14. The computer 12 includes a microprocessor 26, which communicates with the tape controller 22 via an I/O controller 28 such as an EIDE controller or SCSI controller. The computer 12 further includes memory 30 encoded with a program 32 for instructing the microprocessor 26 to send the external commands to the tape drive 14. Additional communications between the computer 12 and the tape drive include status and timing information sent by the tape drive 14 to the computer 12 and data sent between the computer 12 and the tape drive 14.

The program 32 could command the computer 12 to send the "Tape Pack" command in any number of ways. For example, the program 32 could be a tape backup program that, when executed, displays a tool bar including an item labeled "Tools." Among the tools are an "erase" tool, an "initialize" tool and a "retension" tool. Also among the tools is a "Tape Pack" tool When the "Tape Pack" tool is selected, the computer 12 sends the "Tape Pack" command to the tape drive 14. When the tape pack is completed, the program 32 displays a prompt to remove the tape cartridge 8 from the tape drive 14, and the tape drive 14 waits for the tape cartridge 8 to be removed from the tape drive 14.

The tape controller 22 includes a processor 34, which has a port for receiving the external commands from the computer 12. When the Tape Pack command is received, the processor 34 executes a routine 36 stored in controller memory 38. The routine 36 instructs the processor 34 to issue a series of primitive drive mechanism commands which command the drive mechanism 20 to operate at a first speed in a first direction until an end-of-tape is sensed; and then to operate at a second speed in a second direction until a beginning-of-tape is sensed. The second direction is opposite the first direction, and the second speed may be substantially slower than the first speed. After the beginning-of-tape is sensed, the routine 36 instructs the processor 34 to issue a signal indicating that the tape packing has been completed.

Figure 2:
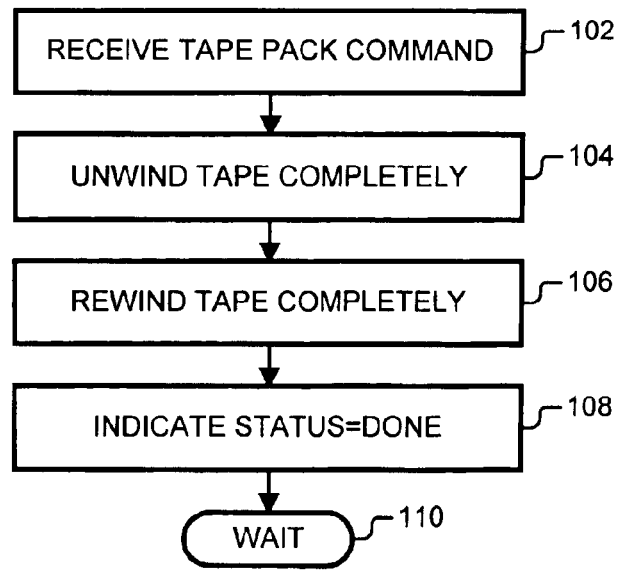
FIG. 2 is an illustration of a method of packing a magnetic tape prior to removal from a tape drive.

FIG. 2 shows a method of using a tape drive 14 to pack a magnetic tape without entraining air. Prior to removal of the tape cartridge 8 from the tape drive 14, the tape controller 22 receives an external command for packing the tape (block 102). The tape controller 22 responds to the external command by issuing low level commands to the drive mechanism 20 to completely unwind the tape at maximum speed (block 104) After the tape has been completely unwound (e.g., to its physical end), the tape controller 22 commands the drive mechanism to completely rewind the tape without reading or writing to it (block 106). The tape is rewound at an appropriate speed and tension so that little if any air is entrained. After the tape has been rewound, the tape drive 14 issues a status signal indicating that the tape pack has been completed and that the tape can be removed from the tape drive 14 (block 108). The tape drive 14 then waits for the tape cartridge 8 to be removed (block 110).

The tape should be unwound completely and rewound completely. Partially unwinding or rewinding the tape could result in damage to the tape pack, since the inner part of the tape pack might be packed under a much lower tension than the outer part of the tape pack.

Thus disclosed is a tape drive that can pack a magnetic tape solidly and tightly. The solid, tight pack reduces the susceptibility of the tape to damage and degradation after the tape has been removed from the tape drive.

The invention is not limited to the computer 12 sending a single type of Tape Pack command. Different types of Tape Pack commands could be sent. For example, the computer 12 could send a "special" command having arguments of "travel" (for a tighter than normal tape pack) and "archive" (for a looser than normal tape pack). The travel argument could be used if the tape cartridge is going to be shipped. The archive argument could be used if the tape cartridge will be sitting on a shelf over an extended period of time.

The invention is not limited to the computer 12 sending high level commands to the tape drive 14. Although it is not typical and, in fact, is usually avoided, the computer 12 can send low level commands directly to the tape drive 14. The low level commands could directly control the tape tension, speed and direction. The low level commands could be issued by operating the tape drive in a diagnostic mode. The most primitive of the low level commands might include motor speed and direction commands. Less primitive low level commands might include a "Logical Forward" command (for controlling the drive mechanism 20 at a read/write speed for reading and writing), a "Physical Reverse" command (for controlling the drive mechanism 20 at the maximum speed towards beginning-of-tape) and a "Physical Forward" command (for controlling the drive mechanism 20 at the maximum speed towards end-of-tape).

Although the invention was described above in connection with tape cartridges, it is not so limited. The invention can be used on any tape. For example, the invention could be used to pack tape on a standard fourteen inch reel.

Thus, the invention is not limited to the specific embodiments described and illustrated above. Instead, the invention is construed according to the claims that follow.

What is claimed is:

1. A computer system comprising:

a tape drive having a tape pack mode of operation, the tape drive including a drive mechanism operable up to a maximum speed; and a tape controller for controlling the drive mechanism, the controller being operable during the tape pack mode to control the drive mechanism to perform a complete tape unwind and then performs complete tape rewind following the tape unwind, the tape rewind being performed without performing a tape read or tape write; and a computer for commanding the tape drive to operate in the tape pack mode and for commanding the tape drive to go into a wait state following completion of the tape pack mode;

wherein the tape drive is capable of issuing a signal indicating when a tape pack is finished; and wherein the computer includes a program for displaying a user prompt to remove tape from the tape drive after the signal has been issued;

whereby a magnetic tape may be removed from the tape drive while the tape drive is in the wait state.

2. The system of claim 1, wherein the tape rewind is set for a speed of about 0.5 meters per second and a tension of about 1 newton.

3. The system of claim 1, wherein the tape rewind is set for a speed of about four meters per second and a tension of about 1.5 newtons.

4. The system of claim 1, wherein the computer includes a program for sending a high level command to the tape controller of the tape drive, and wherein the tape controller, in response to the high level command, issues low level motor commands to perform the tape unwind and then perform the tape rewind.

5. The system of claim 1, wherein the computer includes a program for sending low level commands to the tape drive to cause the tape drive to perform the tape unwind and then perform the tape rewind.

* * * * *